(12) United States Patent
Carl et al.

(10) Patent No.: US 6,575,873 B2
(45) Date of Patent: Jun. 10, 2003

(54) DRIVE SYSTEM AND METHOD FOR DRIVING A DRIVE ASSEMBLY IN A DRIVE SYSTEM

(75) Inventors: Ingo Carl, Gochsheim (DE); Friedrich Graf, Sinzing (DE); Florian Gutknecht Stoehr, Regensburg (DE); Gregor Probst, Landshut (DE); Rainer Reuthal, Unterpleichfeld (DE); Hans-Juergen Schneider, Stettbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/932,879

(22) Filed: Aug. 20, 2001

(65) Prior Publication Data

US 2002/0037790 A1 Mar. 28, 2002

Related U.S. Application Data

(63) Continuation of application No. PCT/DE00/00465, filed on Feb. 18, 2000.

(30) Foreign Application Priority Data

Feb. 18, 1999 (DE) .......................................... 199 06 871

(51) Int. Cl.$^7$ ................................................ B60K 41/06
(52) U.S. Cl. ........................ 477/107; 477/78; 477/109
(58) Field of Search .............................. 477/77, 78, 90, 477/101, 107, 109

(56) References Cited

U.S. PATENT DOCUMENTS

| | | | |
|---|---|---|---|
| 5,036,728 A | | 8/1991 | Kawasoe et al. |
| 5,101,687 A | * | 4/1992 | Iwatsuki et al. ............. 477/109 |
| 5,265,498 A | * | 11/1993 | Fodale et al. ................ 477/109 |
| 5,403,245 A | | 4/1995 | Watanabe et al. ............. 477/54 |
| 5,573,477 A | | 11/1996 | Desautels et al. ........... 477/109 |
| 5,580,331 A | * | 12/1996 | Shiraishi et al. ............ 477/109 |
| 5,609,545 A | * | 3/1997 | Sola et al. .................... 477/78 |
| 5,658,217 A | | 8/1997 | Tsukada ....................... 477/109 |
| 5,816,976 A | | 10/1998 | Kuroiwa et al. ............. 477/102 |
| 5,876,301 A | * | 3/1999 | Tabata et al. ................ 477/109 |
| 5,944,765 A | * | 8/1999 | Saito et al. .................. 477/109 |
| 6,023,647 A | * | 2/2000 | Saito et al. .................. 477/107 |
| 6,024,670 A | * | 2/2000 | Kitagawa et al. ........... 477/109 |

FOREIGN PATENT DOCUMENTS

| | | | |
|---|---|---|---|
| DE | 197 25 816 | 2/1998 | |
| EP | 0 695 665 | 9/1998 | ................. 477/78 |

\* cited by examiner

*Primary Examiner*—Sherry Estremsky
(74) *Attorney, Agent, or Firm*—Lawrence A. Greenberg; Werner H. Stemer; Gregory L. Mayback

(57) ABSTRACT

A method for driving a drive assembly in a drive system having an automatic transmission and an automatic clutch optionally coupling the drive assembly to the automatic transmission in order to transmit torque includes the following steps. Sensing whether a procedure, in particular a gearshift operation, is to be conducted. After the procedure has been sensed, predefining, for at least one time segment of the procedure which is to be carried out a prediction profile for an operational variable that characterizes the operating state of the drive assembly. And, driving the drive assembly based on the predefined prediction profile of the operational variable to minimize a deviation between the operational variable and the prediction profile.

32 Claims, 4 Drawing Sheets

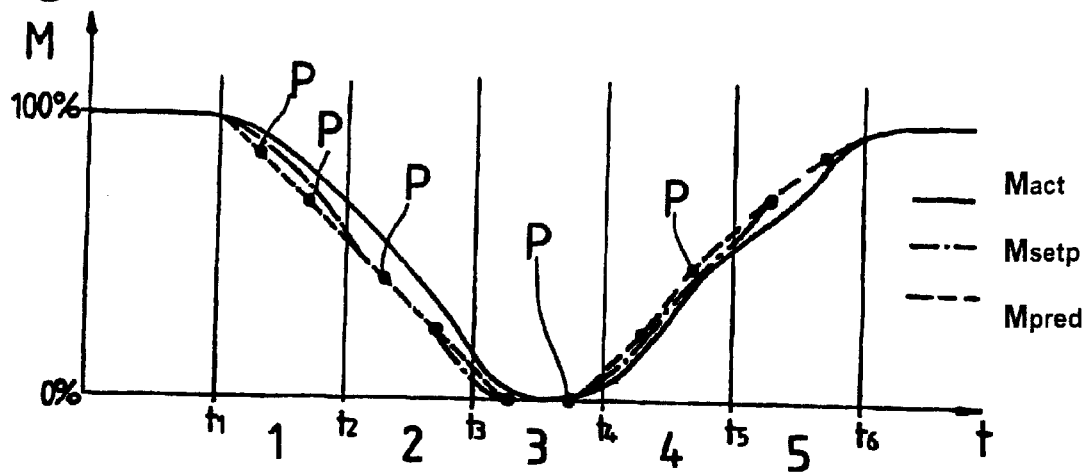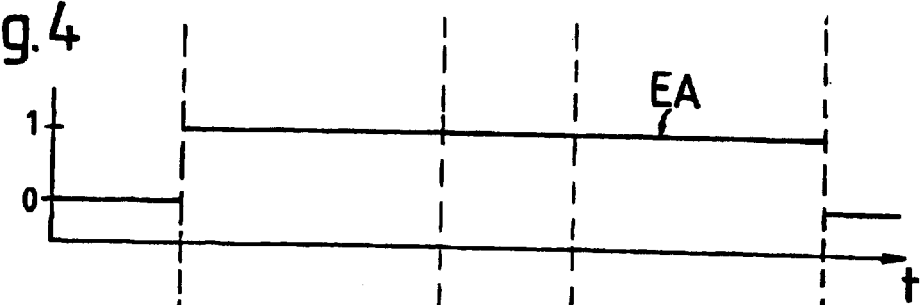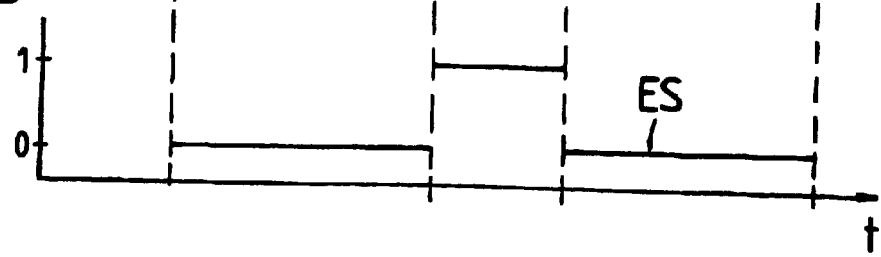

DRIVE SYSTEM AND METHOD FOR DRIVING A DRIVE ASSEMBLY IN A DRIVE SYSTEM

CROSS-REFERENCE TO RELATED APPLICATION

This application is a continuation of copending International Application No. PCT/DE00/00465, filed Feb. 18, 2000, which designated the United States.

BACKGROUND OF THE INVENTION

Field of the Invention

The present invention relates to a method for driving a drive assembly in a drive system, the drive system having an automatic transmission and an automatic clutch that optionally couples the drive assembly to the transmission in order to transmit torque. The invention also relates to a drive system.

European Patent Application EP 0 695 665 B1, corresponding to U.S. Pat. No. 5,609,545, discloses such a drive system in which a first drive apparatus is assigned to the automatic drive assembly, and a second drive apparatus is assigned to the automatic transmission. These drive apparatuses exchange data and when a gearshift operation occurs, the first drive apparatus drives the drive assembly in such a way that the torque thereof is reduced from a starting value to a region of zero. During this reduction in torque, the control device provides for the automatic transmission any setpoint values that are transmitted to the control device of the drive assembly, which are to drive the drive assembly, in such a way that the deviation between the actual value of the torque and the setpoint value is minimized. However, this procedure does not take into account the fact that, on the one hand, the transmission of data between the two drive apparatuses leads to these values being provided with a delay in the drive device for the drive assembly, and that, moreover, the driving of the drive assembly, which is performed by the drive apparatus for the drive assembly in order to set a specific actual value, also takes place with a specific delay because, in particular, intervention into the throttle system of an internal combustion engine is a comparatively sluggish intervention whose reaction takes place with a certain delay. This leads to a situation in which in this known method or this known system there is a relatively large deviation between the actual torque of the drive assembly and the setpoint value predefined by the drive device for the automatic transmission, with the consequence that the desired gearshift characteristic often can no longer be obtained. German Published, Non-Prosecuted Patent Application DE 197 25 816 A1 discloses a method for driving an automatic torque transmission system in which a drive unit drives the drive assembly by reference to predefined setpoint values, the setpoint values being each determined directly from the operating state or a characteristic diagram during the execution of the gearshift operation. Thus, changing values of the torque are used, for example, as setpoint values of the respective nonspecific increment values or decrement values, the increment or decrement values of variables depending on variables, such as, for example, the pedal value, that is to say the depression of an accelerator pedal, the clutch slip and the like. Because these setpoint values for the torque are generated as a function of the actual operating state, they are available only for a relatively short period so that a specific time is necessary for adjusting the actual torque to the setpoint values which are then respectively predefined, with the consequence that here too an undesired delay occurs. This results in the actual torque following the setpoint torque with a specific delay and having a relatively large deviation from the setpoint torque.

SUMMARY OF THE INVENTION

It is accordingly an object of the invention to provide a drive system and method for driving a drive assembly in a drive system that overcomes the hereinafore-mentioned disadvantages of the heretofore-known devices of this general type and that provides a method for driving a drive assembly or a drive system with which the quality of the engine control can be improved when a gear is shifted.

With the foregoing and other objects in view, there is provided, in accordance with the invention, a method for driving a drive assembly in a drive system. The method includes a first step of providing a drive system having an automatic transmission and an automatic clutch coupling the drive assembly to the automatic transmission for transmitting torque. The next step is sensing if a procedure having time segments is to be conducted. The next step is, after the procedure has been sensed, predefining a prediction profile for an operational variable characterizing an operating state of the drive assembly for at least one time segment of the procedure to be conducted. The next step is driving the drive assembly based on the predefined prediction profile of the operational variable to minimize a deviation between the operational variable and the prediction profile.

With the objects of the invention in view, there is also provided a drive system including a drive assembly, an automatic transmission, and an automatic clutch optionally connecting a torque transmission between the drive assembly and the automatic transmission, a first drive control loop for driving the drive assembly, and a second drive control loop for driving the automatic transmission. When a procedure having time segments is conducted, the second drive control loop predefines, for at least one time segment of the procedure, a prediction profile for an operational variable characterizing an operation of the drive assembly. The first drive control loop drives the drive assembly to set an operational variable based on the prediction profile.

According to a first aspect of the present invention, the object is achieved by a method for driving a drive assembly in a drive system. The drive system includes an automatic transmission and an automatic clutch that optionally couples the drive assembly to the transmission in order to transmit torque, the method includes the following steps:

a) sensing whether a procedure, in particular a gearshift operation, is to be conducted, b) after it has been sensed that a procedure, in particular a gearshift operation, is to be conducted, predefining a prediction profile for an operational variable which characterizes the operating state of the drive assembly for at least one time segment of the procedure which is to be carried out, and c) driving the drive assembly on the basis of the predefined prediction profile of the operational variable to minimize a deviation between the operational variable and the prediction profile is minimized.

In the present invention, a specific prediction profile of the operational variable that is to be adjusted is predefined for the drive system so that measures can have already been taken at an early time in order to be able to obtain a desired value of this operational variable at specific times. By reference to this prediction profile, it is therefore possible to perform pre-control, with the consequence that the actual characteristic of the operational variable, which is obtained, for example, during the execution of the gearshift operation has a profile with a significantly smaller deviation from the prediction profile, that is to say than is the case with the actual variable and the setpoint variable of the prior art. Such a procedure with the predefinition of a specific prediction profile can be used for a wide variety of procedures, preferably when shifting gears. Such a procedure also can be an acceleration procedure in which the engine torque is to be changed in a relatively short time by predefining a vehicle driver.

Because the driving states can change during the execution of such procedures, in particular also while shifting gears, for example because the driver actuates the acceleration pedal or a brake pedal during the execution, the prediction profile which is predefined for a specific procedure may no longer be suitable for the operational characteristics present at a given time. In order to be able to take into account such relatively short-term changes in the operational state, it is proposed that the method should also have the following steps:

d) after it has been sensed that a procedure, in particular a shift in gears, predefining at least one setpoint value of the operational variable, and e) if the at least one setpoint value of the operational variable deviates from an assigned prediction value of the prediction profile, driving the drive assembly to minimize a deviation between the operational variable and the at least one setpoint value.

In this procedure, an additional setpoint value which defines a correction term by reference to the possibly present deviation from an assigned prediction value which is therefore determined for an identical time is therefore used, at least when necessary, to set or adjust the operational variable in a corrected fashion.

To do this, there may be provision, for example, for the step e) including the following substeps:

$e_1$) driving a first control point of the drive assembly on the basis of the prediction profile, and $e_2$) driving a second control point of the drive assembly based on a deviation between the at least one setpoint value and the associated prediction value of the prediction profile.

For example, the driving of the drive assembly on the basis of the prediction profile can include the driving of an air inlet system, which is assigned to the drive assembly, that can be embodied as an internal combustion engine.

Such air inlet systems have a relatively long adjustment time when they are driven, i.e. there is a certain delay between the driving of such an air inlet system and the desired adjustment behavior, i.e. the approaching of the actual value to the predefined value, i.e. as the result of the requirement to adjust, for example, a throttle valve and as a result of the fact that even when a throttle valve closes there is an air volume present in the following air intake manifold. Because, in accordance with the method of the invention of the instant application, which values of the operational variable are to be obtained at specific times has already been known for a relatively long time in advance by predefining the prediction profile, it is possible to eliminate the problems referred to above, also to provide, by delaying when driving, for example, an air inlet system, that the driving of the drive assembly on the basis of the prediction profile includes the following steps:

f) determining a reaction time of a control point that is to be driven for a specific drive time on the basis of at least one operating parameter, for example rotational speed, torque, intake air temperature, and intake manifold volume, g) Based on the reaction time, which is determined for the specific drive time, determining a prediction value for a time, which follows the specific drive time by a time equal to the reaction time determined, by reference to the prediction profile, and h) driving the control point at the specific drive time on the basis of the prediction value determined.

This means that a pre-control is performed here, i.e. at a current time a predefined value which is intended for the future is defined for the air inlet system so that at a later time the air inlet system is in a state which is predefined for this later time by reference to the prediction profile.

As already mentioned above, it is possible that correcting setpoint values that deviate from a prediction profile are predefined during the execution of a procedure. To be able to account for such correction variables within a short time, step $e_2$) should include the driving of an ignition system and/or injection system and/or valve actuation system assigned to the drive assembly which is embodied as an internal combustion engine. The driving of these various systems constitutes a relatively rapid intervention into the drive system, i.e. a comparatively rapid reaction in comparison with the driving of the air inlet system is obtained during the changing of the operational variable.

Because this reaction is relatively fast, i.e. a predefined setpoint value can be taken into account relatively quickly, it is possible to provide that the step e) includes, at each specific drive time, the driving of the drive assembly on the basis of a setpoint value, assigned to the specific driving time, of the operational variable.

Therefore, it is not necessary to account for specific delays occurring between the driving and the reaction or for a setpoint value that is present only with a specific delay.

With the method according to the invention, the prediction profile can be predefined in an unchanged way.

In addition, it is possible for the procedure, in particular the gearshift operation, to be divided into a multiplicity of phases, and for the prediction profile to be capable of being varied for phases which are not yet relevant to driving.

The prediction profile that is defined in the method according to the invention can include at least one, preferably at least two, prediction supporting values for the operational variable. If a plurality of phases is provided, it is possible to provide that the prediction profile includes at least one, preferably at least two, prediction supporting values for each of these phases.

The precision of the engine control can be improved further if, in addition to the prediction supporting values that define the prediction profile, at least one, preferably a multiplicity of, prediction supplementary values is provided. The prediction supplementary values are obtained by interpolation or extrapolation including the at least one prediction supporting value.

The operational variable that is to be set or adjusted to a specific profile during the execution of the procedure can be the torque or the rotational speed of the drive assembly. In particular, it is possible that if the procedure is divided into a plurality of phases, the operational variable is the torque for at least one of these phases, and the operational variable is the rotational speed for at least a further phase of these phases.

In particular, if the procedure that is to be executed is a gearshift operation, the torque of the drive assembly is first minimized, in which case when this minimum is approached or reached a gear speed is disengaged and subsequently a new gear is engaged. According to the invention, the operational variable can be the rotational speed of the drive assembly only in a phase in which the torque of the drive assembly reaches the region of a minimum value.

In this way, after a previously selected gear speed has been disengaged, it is possible, by controlling the rotational speed, to change the rotational speed of the drive assembly to a desired value, which coincides with the rotational speed present at the input side of the transmission after the new gear speed is engaged. In this way, synchronization can already be performed at the engine end so that during the subsequent clutch engagement operation, the clutch is loaded only to a small degree. Also, when the clutch is not completely disengaged, it is possible to perform synchronization for the transmission in this way because the input side of the transmission also can be changed to the rotational speed corresponding to the new gear speed by adapting the rotational speed of the drive assembly with the clutch.

With the method according to the invention, it is also possible to provide for the prediction profile, and if appropriate the at least one setpoint value, to be generated in a drive control loop which is assigned to the automatic transmission, and to be transmitted to a drive control loop, assigned to the drive assembly, in order to drive the drive assembly.

According to a further aspect, the object of the invention mentioned at the beginning is achieved by a drive system, in particular for a motor vehicle, including a drive assembly, an automatic transmission, an automatic clutch, which optionally brings about a torque transmission connection between the drive assembly and the automatic transmission, a first drive control loop for driving the drive assembly, a second drive control loop for driving the automatic transmission, and if appropriate the automatic clutch.

When a procedure, in particular a gearshift operation, is conducted, the second drive control loop can predefine, for at least one time segment of the procedure which is to be carried out, a prediction profile for an operational variable that characterizes the operation of the drive assembly, and that the first drive control loop drives the drive assembly in order to set the operational variable on the basis of the prediction profile.

Here, in order to take into account short-term changes in the operating state, the drive system is also designed in such a way that the second drive control loop also determines, during the execution of the procedure, in particular the gearshift operation, at least one setpoint value for the operational variable, and that the first drive control loop also drives the drive assembly on the basis of the at least one setpoint value if there is a deviation between said setpoint value and a corresponding prediction value of the prediction profile.

Other features that are considered as characteristic for the invention are set forth in the appended claims.

Although the invention is illustrated and described herein as embodied in a Method for driving a drive assembly in a drive system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a graph plotting the torque during the execution of a gearshift operation versus time;

FIG. 4 is a graph plotting a signal indicating the execution of a gearshift operation versus time;

FIG. 5 is a graph plotting a signal indicating various phases during the execution of a gearshift operation versus time;

DESCRIPTION OF THE PREFERRED EMBODIMENTS

Figure 1:
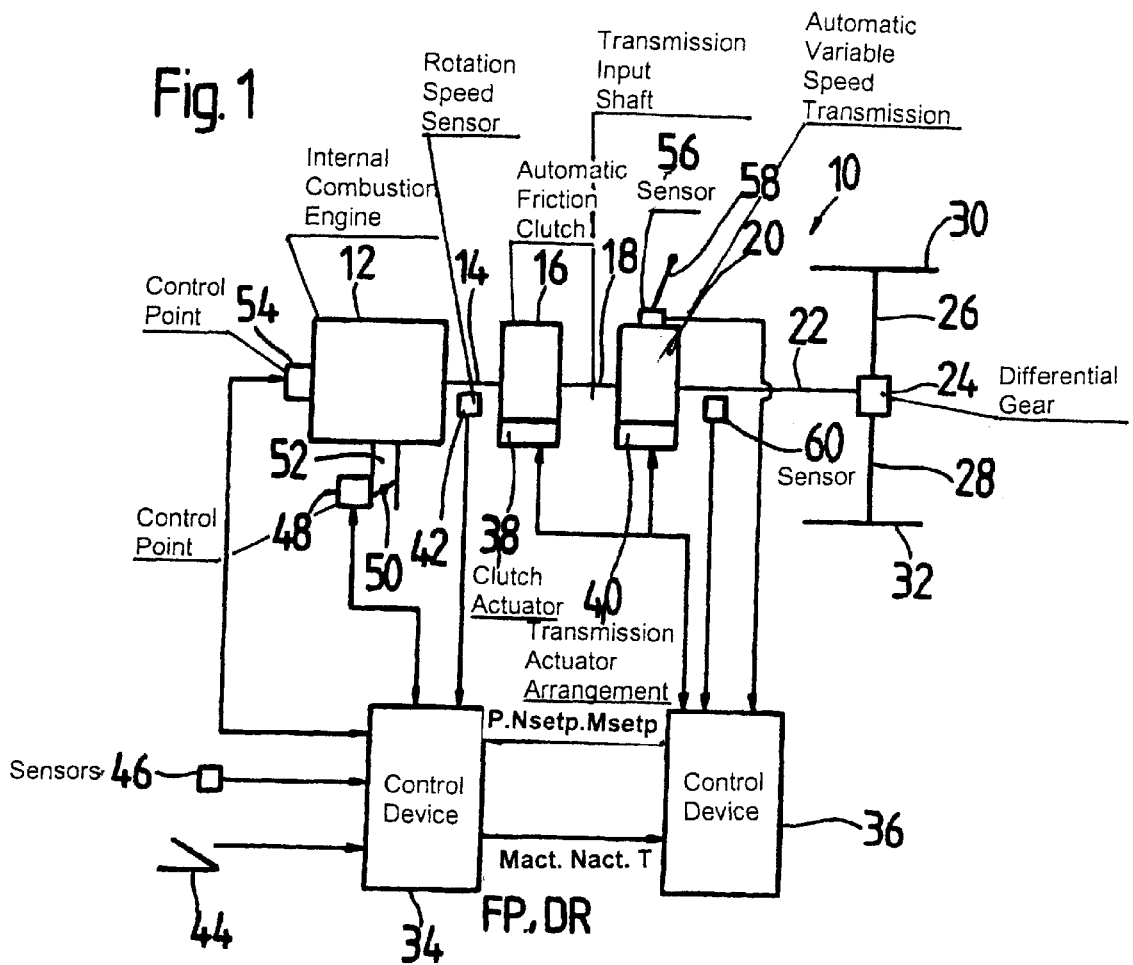
FIG. 1 shows a schematic view of a drive system in a motor vehicle.

In all the figures of the drawing, sub-features and integral parts that correspond to one another bear the same reference symbol in each case.

Referring now to the figures of the drawings in detail and first, particularly to FIG. 1 thereof, there is shown in schematic form a drive system (generally designated by 10) of a vehicle. The drive system 10 includes an internal combustion engine 12 as a drive assembly whose crankshaft 14 is coupled to an input side of an automatic friction clutch 16. The output side of the friction clutch 16 has a rotary connection to a transmission input shaft 18 of an automatic variable speed transmission 20. An output shaft 22 of the transmission 20 drives drive shafts 26, 28 for driven wheels 30, 32 via a differential gear 24. A control device 34 is assigned to the drive assembly, i.e. the internal combustion engine 12. The control device 34 receives various signals and drives the internal combustion engine 12 on the basis of these signals in the fashion described below. A further control device 36, which also receives various signals and, on the one hand, drives a clutch actuator 38 on the basis of these signals and, on the other hand, drives a transmission actuator or a transmission actuator configuration 40, is assigned to the automatic transmission 20 and to the automatic friction clutch 16. In addition, the two control devices 34, 36 exchange information, the connection being possible here by a CAN bus, for example.

The control device 34 for the internal combustion engine 12 receives a rotational speed signal from a rotational speed sensor 42, which signal represents the rotational speed N of the internal combustion engine 12, for example of the crankshaft 14 of the internal combustion engine 12. In addition, the control device 34 receives a signal, which represents the actuation of an acceleration pedal 44. In general, further sensors, which are generally designated by 46 are provided, said sensors sensing, for example, the ambient air temperature, the ambient air pressure, the coolant temperature, and inputting corresponding sensing signals into the control device 34. On the basis of these various items of information, the control device 34 outputs drive signals to various control points (indicated in the figure schematically by 48, 54) in order to control the operation of the internal combustion engine 12 accordingly. The control point 48 is, for example, an air inlet system of the internal combustion engine 12, i.e. a throttle, which is indicated schematically by 50, and is disposed in an air intake manifold 52 and whose position can be varied by an appropriate actuator. Between the control device 34 and the air inlet system 48, there is a two-way exchange of information, i.e. on the one hand the control device 34 outputs drive commands to the air inlet system 48 and on the other hand the air inlet system 48 outputs information relating to the instantaneous positional state of the throttle 50 to the control device 34.

The second control point 54 generally characterizes systems that can continue to be driven in order to influence the operating state of the engine, that is to say, for example, the injection system in the internal combustion engine 12, the ignition system (i.e., the spark plugs) of the internal combustion engine 12, and if appropriate a valve drive system via which the time of the opening and closing of various valves is determined, or various valves can be activated/deactivated. This second control point 54 is also connected to the control device 34 so as to permit two-way exchange of information, i.e. on the one hand the drive signals are transmitted to the latter and on the other hand the latter can feed back to the control device information which characterizes the instantaneous state of this control point.

The control device 36 for the automatic transmission 20 or the friction clutch 16 receives, from an actuation sensor 56, information indicating whether and in what way a gearshift lever 58 has been actuated. On the basis of this information, the control device 36 can detect that a driver wishes to shift gear, and which gear speed he wishes to shift to. In addition, the control device 36 can receive from a sensor 60 information relating to the rotational speed at the transmission output shaft 22, which is ultimately information relating to the instantaneous travel speed. For this purpose, the rotational speed of the drive shafts 26, 28 also could be sensed. On the basis of these sensor signals and information that is described below and that is fed to the control device 36 from the control device 34, the control device 36 drives the actuators 38, 40 if a gearshift operation is to be carried out.

Figure 2:
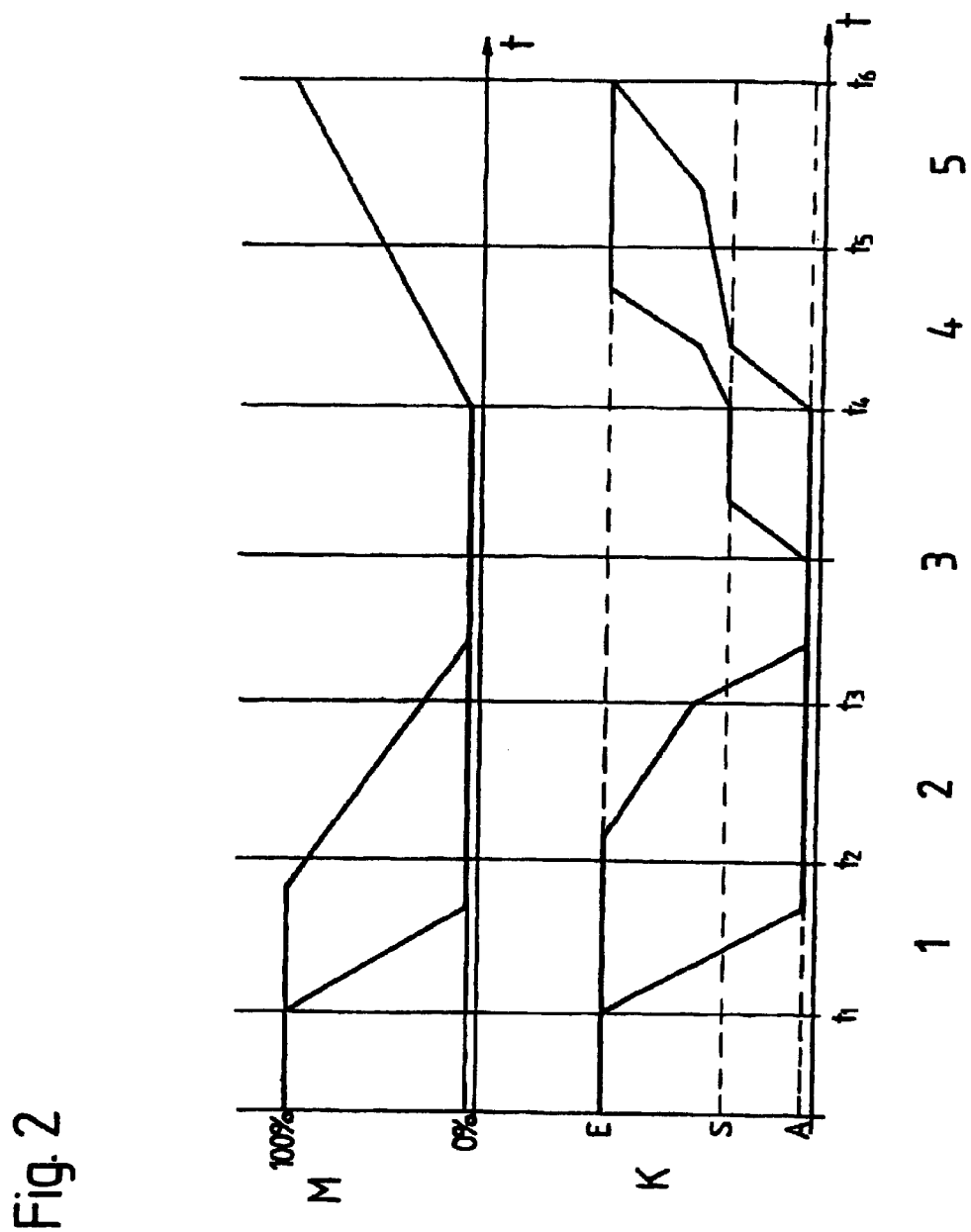
FIG. 2 is a graph plotting the torque of a drive throughout the engagement position and disengagement position of a clutch during the execution of a gearshift operation versus time.

The time sequence of such a gearshift operation is illustrated graphically in FIG. 2. In the upper part of FIG. 2, the torque M of the internal combustion engine 12 is illustrated plotted in a relative fashion, in the lower part the disengagement position K of the clutch 16 is illustrated, E representing the engaged state, A representing the disengaged state, and S representing a state in which the torque transmission via the clutch is interrupted.

If the gearshift lever 58 is actuated by the driver at a time $t_1$, the control device 36 senses this and, as described below, drives the internal combustion engine 12 on the basis of the type of gearshift operation which is to be executed, in order to reduce the torque M of said internal combustion engine 12 so as to disengage and engage the gear speeds. Here, various ramps may be passed through which are selected depending on the operating state and type of the gearshift operation to be executed. In a corresponding way, when the gearshift operation is executed, the clutch is driven in order to disengage or engage the clutch in compliance with the reduction or the increase in the torque M, depending on the ramp which is suitable for a specific gearshift operation. It is clear here in FIG. 2 that the gearshift operation is divided into five phases. Phases 1 and 2 constitute essentially the phases in which the engine torque is reduced. In order to disengage the clutch, phase 3 is a phase in which the engine torque is kept at a minimum value and a previously selected gear speed is disengaged and a new gear speed is engaged. Phases 4 and 5 are phases in which the engine torque is increased again and the clutch is adjusted again in the direction of the completely engaged state.

Below there is a description, with reference to FIGS. 3 to 7, of the manner in which the internal combustion engine 12 is driven in order to control its operation in a desired fashion when executing a gearshift operation. It will be initially assumed again that at the time $t_1$, by actuating the gearshift lever 58 or a control unit which triggers the gearshift operation in an automatic mode, the driver indicates that the gear speed is to be shifted, and to which gear speed it is to be shifted. On the basis of various variables, which characterize the operating state of the system, the control device 36 then determines, for this gearshift operation, which is actually to be executed, a multiplicity of prediction supporting values P (in FIG. 3) which predefine the desired profile of the engine torque M during the execution of the gearshift operation. In order to determine these prediction values P, it is possible, for example, for the control device 36 to access a characteristic diagram in which the sequence of prediction values P which predefine a gearshift operation is defined as a function of a variety of variables, for example the travel speed, the gear speeds which are to be disengaged or engaged and further variables. For this purpose, as indicated in FIG. 1, a multiplicity of information items are also transmitted to the control device 36, said information items including, for example, the engine actual torque $M_{act}$, the engine actual rotational speed $N_{act}$, the engine temperature, that is to say the coolant temperature T, the accelerator pedal position FP, the ambient pressure DR and the desired torque which is predefined by the driver and which is ultimately defined by the pedal position FP. The control device 36 therefore generates the sequence of prediction supporting values P including all these variables, i.e. selects these predictions supporting values P from a characteristic diagram, for example, and transmits them to the control device 34. The control device 34 can then determine a prediction profile $M_{pred}$ for the engine torque M on the basis of these prediction supporting values P, for example by linear interpolation or extrapolation. That is to say a predefined prediction value is made available for each time during the gearshift operation, which is to be executed by reference to the prediction profile $M_{pred}$, which is determined in this way.

As is also clear in FIG. 3 and has already been explained with reference to FIG. 2, the gearshift operation, which is to be carried out is divided into a multiplicity of phases, namely phases 1 to 5. Here, phases 1 and 2 are those phases in which the engine torque M is reduced to a minimum value, phases 4 and 5 are phases in which the engine torque M is increased again after the new gear speed is engaged, and phase 3 is a phase in which ultimately the disengagement of the previously engaged gear speed and the engagement of the newly engaged gear speed takes place. As is described below with reference to FIG. 7, in phase 3 the engine is not driven in order to obtain a specific engine torque but rather in order to obtain a desired rotational speed. That is say that for this phase 3 the control device 36 predefines for the control device 34 a prediction profile which characterizes a plurality of prediction supporting values in order to define a predefined rotational speed profile $N_{pred}$. Ultimately, the control device 36 respectively predefines a multiplicity of prediction supporting values for each of the phases 1 to 5, the prediction supporting values for the same operational variable, that is to say the engine torque or the engine speed, not necessarily being predefined in all the phases, but rather the operational variable which is to be controlled can change between different phases.

In general, when predefining the prediction supporting values the procedure adopted is such that at the time $t_1$, that is to say at the time at which the execution of a gearshift operation is sensed, the complete profile between the times $t_1$ and $t_6$ is predefined. By reference to this predefinition, the internal combustion engine 12 can then be driven by the control device 34. However, it is also possible, for the purpose of adaptation to changing operation states, to consider in each case as permanently predefined only those prediction supporting values P which are in a phase which is relevant to driving at that particular time. That is to say directly after the time $t_1$ during the course of phase 1 there is still the possibility of changing the prediction values for phases 2 to 5. Only the prediction values for phase 1 remain predefined. If the end region of phase 1 is reached, there is the possibility, as described below, that prediction values of phase 2 are also accessed even during phase 1. In this case, the prediction profile $M_{pred}$ of phase 2 is therefore already relevant to driving during phase 1 so that the prediction profile, i.e. the prediction supporting values P, are from now on also considered as permanently predefined for this phase 2. It is then possible to change only the prediction supporting values P for phases 3 to 5. In order to indicate to the control device 34 that a specific procedure, for example a gearshift operation, is to be executed, the control device 36 also transmits an engagement activation signal EA whose profile is illustrated in FIG. 4. As long as there is no procedure to be executed, this signal is, for example, at a low level; as soon as it is sensed that a gearshift operation is to be executed, this signal changes to a high level, which indicates to the control device 34 that the internal combustion engine 12 is now to be driven on the basis of the variables transmitted by the control device 36. Furthermore, an engagement status signal ES which represents the instantaneous engagement status is transmitted by the control device 36. This signal ES, whose profile is illustrated in FIG. 5, serves to indicate to the control device 34 which operational variable of the internal combustion engine 12 is to be adjusted to a specific characteristic. Thus, for example the signal ES, which is generated only if the signal EA is at a high level, can be at a low level if the operational variable to be controlled is the engine torque M, and can be at a high level if the variable which is to be controlled is the engine speed. It is also to be noted that the signal ES can also be divided further in order to characterize the various phases 1, 2 and 4, 5.

If, therefore, the control device 36 has sensed at the time $t_1$ that a gearshift operation is to be executed, and defines the prediction supporting values P for the gearshift operation to be executed and transmits them to the control device 34 together with the signals EA and ES, the control device 34 then drives the drive assembly 12 on the basis of these prediction supporting values P or the prediction profile $M_{pred}$ determined by reference to these prediction supporting values P. The manner in which this driving is performed is described below in particular with reference to FIG. 6.

Figure 6:
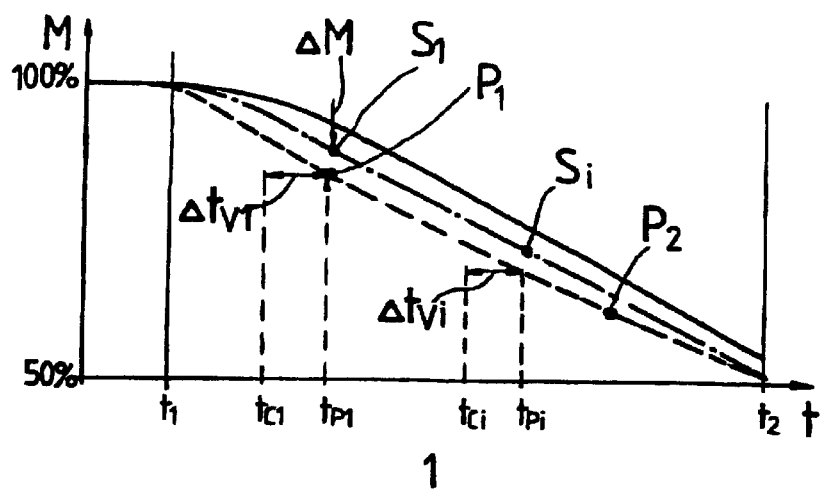
FIG. 6 is an enlarged partial view of the graph illustrated in FIG. 3, in a first phase of the gearshift operation.
Figure 7:
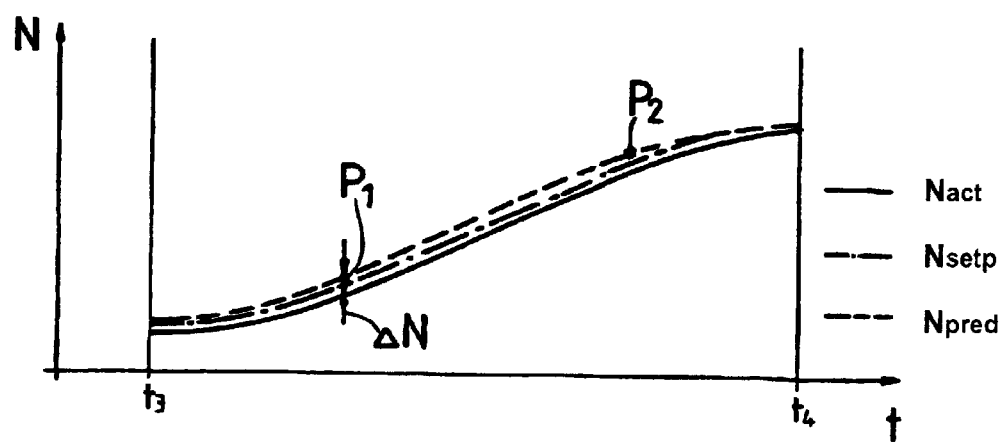
FIG. 7 is an enlarged partial view of the profile of the rotational speed in the third phase of the time profile illustrated in FIG. 3.

After the control device 34 has information relating to the prediction profile $M_{pred}$, it will firstly adjust the engine torque M to the prediction profile $M_{pred}$, essentially by driving the air inlet system 48. However, as already mentioned, the air inlet system 48 now has a delayed response behavior. That is to say when a drive command is output to the air inlet system 48, the desired reaction will not take place until after a specific delay dependent on the operating state. This is also due to the fact that the throttle 50, which has a certain degree of inertia has to be set in motion, and that there is still a volume of air, initially still available for combustion, contained in the air intake manifold 52 even when the throttle 50 closes. The control device 34 can determine, for example by reference to a characteristic diagram composed of various variables that characterize the operating state of the system, a reaction delay $\ddot{A}t_v$ of the air inlet system 48 which is to be expected for a specific time. These various operational variables may be, for example, the temperature of the intake air, the rotational speed of the internal combustion engine, the torque of the internal combustion engine, and the known volume of the air intake manifold. If the control device 34 has determined this delay $\ddot{A}t_v$, it can then carry out a pre-control, illustrated in FIG. 6, on the basis of this known reaction delay. It will be assumed, for example, that at the time $t_{C1}$ the control device 34 is to issue a driving command to the air inlet system 48. A reaction delay $\ddot{A}t_{v1}$ that is to be expected for this time, that is say including the operational states present at this time, is then determined at the time $t_{C1}$, as described above. If this reaction delay $\ddot{A}t_{v1}$ is determined at the time $t_{C1}$ it is possible to define, at this time $t_{C1}$ by reference to the prediction profile $M_{pred}$, which prediction value of the prediction profile $M_{pred}$ is predefined at a time which follows the instantaneous driving time $t_{C1}$ by this delay time $\ddot{A}t_v1$. In the example illustrated, this is the prediction supporting value P1 at the time $t_{P1}$. This prediction value P1 which is determined at the time $t_{C1}$ by reference to the delay $\ddot{A}t_{v1}$ and is to be applied for the time $t_{P1}$ then forms the prediction value which is to be used at the driving time $t_{C1}$, i.e. at the time $t_{C1}$ the drive device 34 will drive the air inlet system 48 using the prediction value P1. The consequence is that owing to the delay, which then occurs in the air inlet system, the system can be adjusted to the prediction value P1 with a relatively high degree of accuracy at the time $t_{P1}$. This operation is executed for all the driving times defined by the working clock of the control device 34, as is also illustrated in FIG. 6 by the times $t_{Ci}$ and $t_{Pi}$. A control behavior is thus obtained in which the control delay in the air inlet system that is to be expected at a given time is taken into account at each driving time. The deviation to be expected between a prediction value, which is then to be applied and the actual value $M_{act}$ can be significantly reduced. If the end of a phase is approached, that is to say the time $t_2$ in FIG. 6, the prediction profile $M_{pred}$ defined for phase 2 is accessed during phase 1 on the basis of the pre-control behavior described. This means that for this other phase also, the prediction profile $M_{pred}$ must be fixed at the latest starting from such a time at which the prediction profile $M_{pred}$ of another phase is accessed for the first time.

The advantage of this driving behavior is that the control of the engine torque can be performed as an operational variable, on the basis of the driving of the air inlet system 48, with the consequence that the exhaust gases, which are generated during combustion have the smallest possible proportion of environmentally damaging components. If such an intervention were performed solely on the basis of the driving of the second control point 34, that is to say of the ignition system or, for example, of the injection system, the proportion of environmentally damaging components in the exhaust gas would be unacceptable. However, it is to be noted that in the procedure which is described above with reference to FIG. 6 and which has the purpose of driving the air inlet system 48, it is equally possible to act simultaneously on the further control point 54 in order to obtain not only the optimum position in the air inlet system for each prediction value of the prediction profile but also to obtain in each case the optimum position in the further control point, that is to say the optimum injection quantity or the optimum ignition time, in a way which is assigned to this position of the air inlet system. In this way, the emission of pollutants can be further reduced.

During the execution of a gearshift operation, a change in the operating state can occur for example as a result of the accelerator pedal position being changed. However, a changed operating state can mean that the prediction supporting values P which are predefined at the start of the gearshift operation and the prediction profile $M_{pred}$ which is determined therefrom are no longer optimum for the changed operating states. However, since it is no longer possible to change this prediction profile or the prediction supporting values at least for a phase that is already relevant to driving, according to the present invention there is also provision that, in order to enable the control device 36 to take into account such changing operating states, at least one setpoint value or a setpoint profile $N_{setp}$ or $M_{setp}$ for the engine speed or the engine torque is also transmitted to the control device 34 during the execution of the procedure, that is to say of the gearshift operation. These setpoint values can also be determined, for example, by taking into account the data transmitted from the control device 34 to the control device 36. These values, which represent a setpoint profile $M_{setp}$ or $N_{setp}$ are then used in the control device 34 to correct the adjustment of the actual value $M_{act}$ or $N_{act}$ that is performed by reference to the driving procedure (which is illustrated above) of the air inlet system 48. It is apparent, for example in FIG. 6 for phase 1, that there is a deviation between the setpoint torque $M_{setp}$ and the prediction profile $M_{pred}$ over virtually the entirety of phase 1. This is characterized in particular for the time $t_{P1}$ by the deviation $\ddot{A}M$. However, because the control device 34 only receives these setpoint values S during the execution of the gearshift operation, it cannot take into account these setpoint values S during the precontrol described above. For example, it is to be assumed that at the time $t_{P1}$ the control device 34 receives the setpoint value S1 from the control device 36. The control device 34 will then use the setpoint value S1 directly at this time $t_{P1}$ to determine a deviation between this setpoint value S1 and the prediction value P1 defined for this time $t_{P1}$. On the basis of this deviation, the control device 34 will then drive the very rapidly reacting second control point 54 in order, by suitably acting on the ignition system and/or the injection system and/or the valve actuation system, to take into account in a very short time the deviation present at the time $t_{P1}$ between the prediction value P1 assigned to this time and the setpoint value S1 that is also assigned to this time and/or received in the device 34 at this time. This means that at this time $t_{P1}$, finally the engine torque M is adjusted to the setpoint value S1. If this is performed for all the driving times $t_{Ci}$, on the one hand the engine actual torque is already made to approach the prediction profile to a relatively satisfactory degree as a result of the pre-control by reference to the prediction supporting values or the prediction profile. If changes occur owing to the travel state, they can be taken into account spontaneously by acting on the relatively rapidly reacting control point 54 of the internal combustion engine 12.

Here, it is also possible to ignore the fact that a specific time delay will occur during the transmission of data between the two control devices 34 and 36. That is to say, for example at the time $t_{P1}$ the control device 34 receives a setpoint value S1 which has been emitted at an earlier point by the control device 36, i.e. has been determined for a time lying in the past. However, because this delay is relatively short, the control device 34 uses, at each driving time, the setpoint value, which has been sent to it at this time, as a correction variable. The error, which occurs during the transmission of data as a result of this delay is negligible because the significant portion of the control of the engine torque is anticipated by the prediction and the expected deviations in the setpoint values from the prediction profile are relatively small.

When a gearshift operation is executed, the actuator or the actuator configuration 40 of the transmission 20 is generally already driven during the reduction of the torque of the engine and during the disengagement operation of the clutch, in order to build up a certain shifting force. If, as a result of the engine torque being reduced, the drive train is then virtually load free, a state is reached in which the shifting force, which is built up and the load on the drive train, which counteracts the shifting operation are in balance so that the gear selected at that time is then forcibly engaged. This will occur in the region of the start of phase 3 or at the end of phase 2 in the illustrations in FIGS. 2 and 3. If the engine torque M has then approached its minimum value in the region of zero and if the clutch is disengaged or virtually completely disengaged, the next gear speed can be engaged. However, this engagement of the next gear speed has the consequence that the transmission input shaft 18 would rotate with a predetermined rotational speed defined by the rotational speed of the transmission output shaft 20 and the transmission ratio of the newly selected gear speed, said predetermined rotational speed not necessarily corresponding to the rotational speed of the internal combustion engine 12, i.e. the crankshaft 14 thereof. If the clutch 16 were subsequently engaged, a gear-shifting jolt would possibly occur, at least considerable wear to the clutch would be caused. For this purpose, according to the present invention there may be provision for the control of the internal combustion engine 12 to be no longer performed by reference to the torque M but rather by reference to the rotational speed N in that phase of the gearshift operation in which the engine torque M has reached its minimum value and is possibly kept approximately constant for a short time. For the following phases 4 and 5, the level of torque of the internal combustion engine is namely of subordinate significance. Consequently, by selecting the rotational speed N as a control variable in this phase an appreciable change can occur in the torque M. It is of great significance that the difference between the rotational speeds of the transmission input and the crankshaft is minimal. For this purpose, as described above, the prediction profile is predefined in this phase 3 by prediction supporting values P for the engine speed N, i.e. a prediction profile $N_{pred}$ (illustrated in FIG. 7) for the engine speed. The control device 34 detects this change in the control variable via reference to the signal ES and then executes a rotational speed control operation during phase 3. This control operation takes place precisely in the way described above with reference to FIG. 6 with the torque. This means that the air inlet system 48 is essentially driven on the basis of the predefined prediction profile or the individual prediction values in order to obtain the desired rotational speed of the internal combustion engine 12. If the operational conditions change, setpoint values S which characterize a setpoint profile $N_{setp}$ are again transmitted to the device 34 by the control device 36 so that if a deviation $\ddot{A}N$ occurs between the prediction values or the prediction profile and the currently transmitted setpoint values, a correction can be performed again by suitably driving the injection system or the valve actuation system. The pre-control that is described above in detail with reference to FIG. 6 during the selection of the rotational speed as operational variable to be controlled also can be performed during the selection of the prediction values to be used for a specific control time, in particular for the air inlet system 48. In this way, the rotational speed of the internal combustion engine 12 can be adjusted, during phase 3, to a desired level that corresponds to the rotational speed level that is to be expected at the transmission input shaft 18 with the new gear speed. Furthermore, in this way it would also be possible to synchronize the transmission, namely by placing the clutch in a state in which it can transmit at least a low torque, in a second half of phase 3 as indicated in FIG. 2. If during this phase the rotational speed of the internal combustion engine is then also adjusted to the value predefined at the transmission input side, the transmission input shaft is also made to approach this value by using the clutch 16, with the result that after the termination of phase 3, synchronization of the transmission has been performed, forcibly brought about by the suitable driving of the internal combustion engine 12 and the slight engagement of the clutch 16. The new gear speed can then be engaged, and this engagement can be performed very rapidly because there is no longer any synchronization to be performed in the transmission itself.

The present invention provides a method and a drive system with which in particular a gearshift operation can be instigated with a high degree of quality, i.e. essentially free of jolts and with low wear in the region of the clutch and of the transmission. The internal combustion engine can be optimized for the respective gearshift operation by predefining the prediction profile and with additionally provided corrections, taking into account operating states at a given time, by reference to setpoint values, it being ensured on the basis of the drive characteristic obtained that the emission of pollutants is kept to a minimum during the entire procedure. It is to be noted that driving the internal combustion engine in such a way is not necessarily performed only during a gearshift operation. Such driving can also be provided during an acceleration or deceleration operation. In which case, the prediction supporting values and the setpoint values are not necessarily generated by the transmission control device itself but can, for example, also be generated in the engine control device 34 itself, namely by reference to the information which is input into said engine control device 34 and which characterizes the travel state. It is also to be noted that the number of prediction supporting values for the entire procedure is freely selectable. The greater the number of prediction supporting values the more precisely the prediction profile can be adapted to an optimum profile both for the engine torque and for the engine speed. During the division into a plurality of phases, at least two prediction supporting values should be predefined for each of these phases, and the prediction supporting values can lie, as is apparent in FIGS. 3, 6, and 7, in each case in an intermediate region of the initial phases, but may equally well also define the starting point and end point and, if appropriate, an intermediate point in this phase. For these setpoint values, it is also possible to provide in the control device 34 that an expected setpoint profile is determined by extrapolation by reference to setpoint values which have already been received so that if, for example, no setpoint value is available at a specific driving time owing to disrupted or delayed data transmission, a setpoint value which is defined in the control device itself can be used as a correction variable.

During the definition of the prediction supporting values, it is also possible to adopt a procedure in which said prediction supporting values are generated adapted to the working clock of the control device 34. That is to say a prediction supporting value may be predefined for each working cycle of the control device 34, which ultimately represents a driving time, so that the operation of determining or defining various prediction intermediate values by interpolation or extrapolation is no longer necessary in the control device 34. Where driving times are mentioned in the present text, it is self-evident that these also include minimum time ranges around a specific time that is necessary in order to be able to execute the operations, provided for a specific time, of determining a variety of variables and of outputting a variety of drive signals.

The procedure described above is a procedure such as is applied in particular in conjunction with a spark ignition internal combustion engine. In such internal combustion engines, it is known to consider the air inlet system on the one hand and the injection control point or ignition control point on the other as slowly or rapidly reacting control points of the internal combustion engine. If other conditions occur in drive assemblies of other types for reasons of construction, i.e. if, of the control points described above, other control points are to be considered as rapidly reacting or as slowly reacting control points, it is self evident that, according to the teaching of the present invention, the pre-control described can be controlled by acting on the slowly reacting control points and the correcting intervention can be performed by engaging in the rapidly reacting control points.

We claim:

1. A method for driving a drive assembly in a drive system, which comprises:
   a) providing a drive system having an automatic transmission and an automatic clutch coupling the drive assembly to the automatic transmission for transmitting torque;
   b) sensing if a procedure having time segments is to be conducted;
   c) after the procedure has been sensed, predefining a prediction profile for an operational variable characterizing an operating state of the drive assembly for at least one time segment of the procedure to be conducted, the prediction profile including at least one prediction-supporting value for the operational variable; and
   d) driving the drive assembly based on the predefined prediction profile of the operational variable to minimize a deviation between the operational variable and the prediction profile.

2. The method according to claim 1, wherein the procedure is a gearshift operation.

3. The method according to claim 1, which further comprises:
   e) after sensing that a procedure is to be conducted, predefining at least one setpoint value of the operational variable; and
   f) when at least one setpoint value of the operational variable deviates from an assigned prediction value of the prediction profile, driving the drive assembly to minimize a deviation between the operational variable and the at least one setpoint value.

4. The method according to claim 3, wherein step f) includes:
   $f_1$) driving a first control point of the drive assembly based on the prediction profile;
   $f_2$) driving a second control point of the drive assembly based on a deviation between the at least one setpoint value and the associated prediction value of the prediction profile.

5. The method according to claim 4, wherein the drive assembly is an internal combustion engine, and the step $f_2$) includes driving at least one of an ignition system and a valve actuation system assigned to the drive assembly.

6. The method according to claim 3, wherein the step e) includes, at each specific drive time, driving the drive assembly based on a setpoint value assigned to the specific drive time of the operational variable.

7. The method according to claim 1, wherein the drive assembly is an internal combustion engine and the driving of the drive assembly based on the prediction profile includes driving an air inlet system assigned to the drive assembly.

8. The method according to claim 1, wherein the driving of the drive assembly based on the prediction profile includes the following steps:

g) determining a reaction time of a control point to be driven for a specific drive time based on at least one operating parameter;

g) based on the reaction time determined for the specific drive time, determining a prediction value for a time following the specific drive time by a time equal to the reaction time by referring to the prediction profile; and h) driving the control point at the specific drive time based on the prediction value determined.

9. The method according to claim 8, wherein the at least one operating parameter includes rotational speed.

10. The method according to claim 8, wherein the at least one operating parameter includes torque.

11. The method according to claim 8, wherein the at least one operating parameter includes intake air temperature.

12. The method according to claim 8, wherein the at least one operating parameter includes intake manifold volume.

13. The method according to claim 1, which comprises predefining the prediction profile in an unchangeable way.

14. The method according to claim 1, which comprises:

dividing the procedure into a multiplicity of phases; and varying the prediction profile for phases not yet relevant to driving.

15. The method according to claim 14, which further comprises including in the prediction profile at least one prediction supporting value for each phase.

16. The method according to claim 15, which further comprises including in the prediction profile at least two prediction supporting values for each phase.

17. The method according to claim 14, which comprises:

using torque of the drive assembly as the operational variable for at least one of the phases; and using rotational speed of the drive assembly as the operational variable for at least one of the phases.

18. The method according to claim 17, which comprises using, as the operational variable, rotational speed of the drive assembly only in a phase in which the torque of the drive assembly is minimized.

19. The method according to claim 1, wherein the prediction profile includes at least two prediction-supporting values for the operation variable.

20. The method according to claim 1, which comprises including in the prediction profile at least one prediction supplementary value obtained by interpolation including the at least one prediction supporting value.

21. The method according to claim 20, which comprises including the prediction profile a plurality of supplementary values obtained by interpolation including the plurality of prediction supporting values.

22. The method according to claim 1, which comprises including in the prediction profile at least one prediction supplementary value obtained by extrapolation including the at least one prediction supporting value.

23. The method according to claim 22, which comprises including the prediction profile a plurality of supplementary values obtained by extrapolation including the plurality of prediction supporting values.

24. The method according to claim 1, which comprises using torque of the drive assembly as the operational variable.

25. The method according to claim 1, which comprises using rotational speed of the drive assembly as the operational variable.

26. The method according to claim 1, which comprises:

generating the prediction profile in a drive control loop assigned to an automatic transmission; and transmitting the prediction profile to a drive control loop assigned to the drive assembly in order to drive the drive assembly.

27. The method according to claim 26, which comprises:

generating the at least one setpoint value in a drive control loop assigned to an automatic transmission; and transmitting the at least one setpoint value to a drive control loop assigned to the drive assembly in order to drive the drive assembly.

28. A drive system, comprising:

a drive assembly;

an automatic transmission;

an automatic clutch optionally connecting a torque transmission between said drive assembly and said automatic transmission;

a first drive control loop for driving said drive assembly;

a second drive control loop for driving said automatic transmission;

said second drive control loop predefining, upon conducting a procedure having time segments, for at least one time segment of the procedure, a prediction profile for an operational variable characterizing an operation of said drive assembly, the prediction profile including at least one prediction-supporting value for the operational variable; and said first drive control loop driving said drive assembly to set the operational variable based on the prediction profile.

29. The drive system according to claim 28, wherein the drive assembly is for a motor vehicle.

30. The drive system according to claim 28, wherein said second drive control loop is for driving said automatic clutch.

31. The drive system according to claim 28, wherein the procedure is a gearshift operation.

32. The drive system according to claim 28, wherein said second drive control loop also determines, during the execution of the procedure, at least one setpoint value for the operational variable; and said first drive control loop also drives said drive assembly based on the at least one setpoint value when there is a deviation between the setpoint value and a corresponding prediction value of the prediction profile.

* * * * *